(12) United States Patent
Lee

(10) Patent No.: US 7,828,069 B2
(45) Date of Patent: Nov. 9, 2010

(54) FIRE EXTINGUISHING ROOF SOAKER

(76) Inventor: Allan Wayne Lee, 619 Richmond Ave. N., Lehigh Acres, FL (US) 33972

( * ) Notice: Subject to any disclaimer, the term of this patent is extended or adjusted under 35 U.S.C. 154(b) by 233 days.

(21) Appl. No.: 12/242,498

(22) Filed: Sep. 30, 2008

(65) Prior Publication Data

US 2009/0090520 A1    Apr. 9, 2009

Related U.S. Application Data

(60) Provisional application No. 60/978,329, filed on Oct. 8, 2007.

(51) Int. Cl.
*A62C 2/00* (2006.01)
(52) U.S. Cl. .............................. 169/43; 169/16; 169/68; 169/54; 239/208; 239/289; 248/49; 248/56; 248/65; 248/74.1
(58) Field of Classification Search .................. 169/43, 169/16, 68, 54; 239/208, 209, 289; 248/49, 248/65, 74.1, 56, 84, 77, 75, 62, 48.1
See application file for complete search history.

(56) References Cited

U.S. PATENT DOCUMENTS

| | | | |
|---|---|---|---|
| 1,831,880 A * | 11/1931 | Pierce | ...................... 169/16 |
| 4,175,703 A | 11/1979 | Valiant | |
| 4,330,040 A | 5/1982 | Ence et al. | |
| 4,453,155 A | 6/1984 | Cooper | |
| 5,083,618 A | 1/1992 | Hayes | |
| 5,692,571 A | 12/1997 | Jackson | |
| 5,732,511 A | 3/1998 | Scott | |
| 6,109,361 A | 8/2000 | Henderson | |
| 6,360,968 B1 | 3/2002 | Orrange et al. | |
| 6,450,264 B1 | 9/2002 | Christian | |
| 6,824,073 B1 * | 11/2004 | Haney | ...................... 239/208 |
| 6,964,379 B2 | 11/2005 | Crowley | |

* cited by examiner

*Primary Examiner*—Dinh Q Nguyen

(57) ABSTRACT

The present invention is a spraying system that extinguishes flying embers that may land on a roof from brush fires or forest fires. This includes a submersible pump at the bottom of a well that is attached to a supply pipe that allows water to be pumped into a reservoir. Another submersible pump is inside the reservoir that pumps water thru a supply pipe that is attached to the roof. This area is called a water station that may also be equipped with a generator for a backup power source. The supply pipe has pipe couplings attached at certain intervals and has sprayers installed into the couplings. These sprayers will then give off an adequate amount of water to soak down the entire roof area in the event of an approaching fire. All of this is assembled and placed in specially designed roof fasteners that are installed throughout the entire hip and ridge of the roof.

2 Claims, 5 Drawing Sheets

FIRE EXTINGUISHING ROOF SOAKER

CROSS-REFERENCE TO RELATED APPLICATIONS

This application claims the benefit of earlier priority based upon the filing of a provisional application Ser. No. 60/978,329, which was filed on Oct. 8, 2007.

BACKGROUND OF THE INVENTION

1. Field of the Invention

This invention relates generally to a fire extinguishing roof soaker.

2. Background

Wildfires are extremely common in many places around the world, including many forested areas of the United States and Canada. In areas that are particularly susceptible to wildfires the climates are sufficiently wet so as to allow for the growth of trees and brush that will ultimately fuel the fires, but also experience exceptional dry periods during the summer and fall months, thus leading to conditions that are perfect for widespread fires. There are a number of different reasons that these fires start, but regardless of how they start they pose a serious threat to those who live in the path of such a fire.

For many years the policy of the United States Forest Service was to suppress all fires by vigorously fighting fires and attempting to put them out as soon as possible. This policy unfortunately led to the unintended consequence of causing more severe wildfires. This happened because rather than allowing fires to burn up highly combustible materials the fires were extinguished, thereby allowing combustible materials to build up over time. So when a large scale fire would break out there would be a tremendous amount of fuel, which would lead to raging fires that soon managed to get out of control.

Focus in recent years has shifted from the suppression of any and all fires to embrace the understanding that fires play a vital role in the ecosystem. This shift in philosophy is not particularly good news for homeowners, particularly those who have relocated from urban areas to rural areas most likely to be hit by wildfires. Therefore, as rural areas increasingly undergo greater development it is necessary for homeowners to take steps to protect their home in the event of a future wildfire.

During a wildfire it is quite common for government officials to order mandatory evacuations with little or no warning. Thus, if a homeowner is going to take preventive measures to protect a home located in an area susceptible to wildfires the measures must be taken well in advance of any possible threat.

Heretofore there have been a number of solutions that have attempted to provide fire suppression systems for use in homes. Some of these systems extend along a peak of a roof of a building and along an underside of eaves of the building, while others run pipes along the ridge and hip of a building to release water onto the roof of a building to prevent the roof and building from catching fire. These and other known solutions fail to meet the needs of homeowners.

It would be desirable to have a fire suppression device capable of being mounted on the roof of a building that is maintenance free after installation and which can be installed under roofing materials. Furthermore, it would be desirable to have a device that does not require any penetrations being made in the roofing materials.

SUMMARY OF THE INVENTION

The present invention advantageously fills the aforementioned deficiencies by providing a fire suppression and extinguishing system for installation on a roof of a building that is maintenance free and that can be easily installed or reinstalled under roofing materials, and which further requires no penetrations in the roofing materials.

The present invention spraying system is used to suppress and extinguish fires, and is particularly useful to prevent flying embers from a wildfire or brush fire from landing on a roof and causing the home to burn. In order to provide this desired functionality the present invention includes a submersible pump that is lowered into a water source, such as but not limited to a well, a swimming pool, or a pond. This pump is attached to a supply pipe that allows water to be pumped into a reservoir. Another submersible pump is located inside the reservoir and pumps water thru a supply pipe that is preferably attached to a roof, but may be attached elsewhere on or around a building or structure. This reservoir apparatus, sometimes referred to as the water station, is also preferably equipped with a generator to provide a backup power source.

The supply pipe leading from the reservoir has pipe couplings attached at certain intervals and has sprayers installed into the couplings. These sprayers will then give off an adequate amount of water to soak down the entire roof area in the event of an approaching fire. All of this is assembled and placed in specially designed roof fasteners that are installed thru the entire hip and ridge of the roof.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
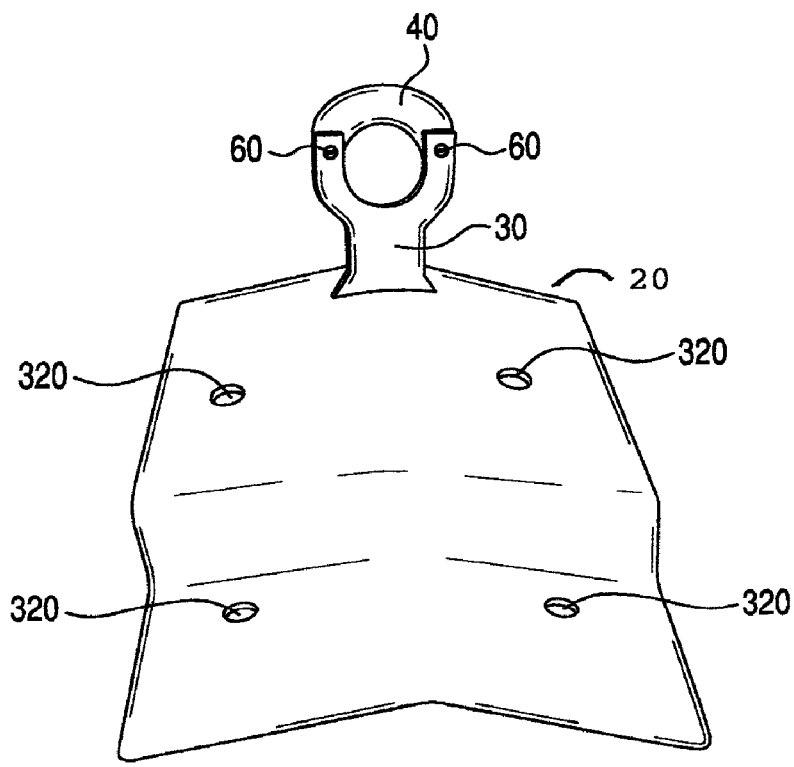
FIG. 1: is a top perspective view of a hip and ridge roof fastener.

FIG. 1 shows roof fasteners 20, which are preferably made of aluminum, but which can also be made from other various materials including, but not limited to, galvanized stainless steel and copper.

Each of the hip and ridge roof fasteners 20 is formed with a base element having length and width and a slight thickness, and being resiliently formable to match the shape of a roof section pitch where said fastener is to be installed, and are secured to the decking through opening 320 with screws, preferably 1¼" wood screws. The fasteners are primed with asphalt roofing primer to clean and prepare the fastener surface for application of a thin layer of plastic roof cement applied over the entire hip and ridge fastener 20. The hip and ridge shingles are installed over the hip and ridge roof fasteners. The hip and ridge shingles preferably being installed with screws through opening 320, preferably 1¼ inch wood screws, although nails or even staples could be used. This creates a sandwiched area between the plastic roof cement and the asphalt underlayment of the shingle to fuse and bond the shingles to the fastener so that the only visible part of the hip and ridge roof fastener 20 is fork 30.

Figure 2:
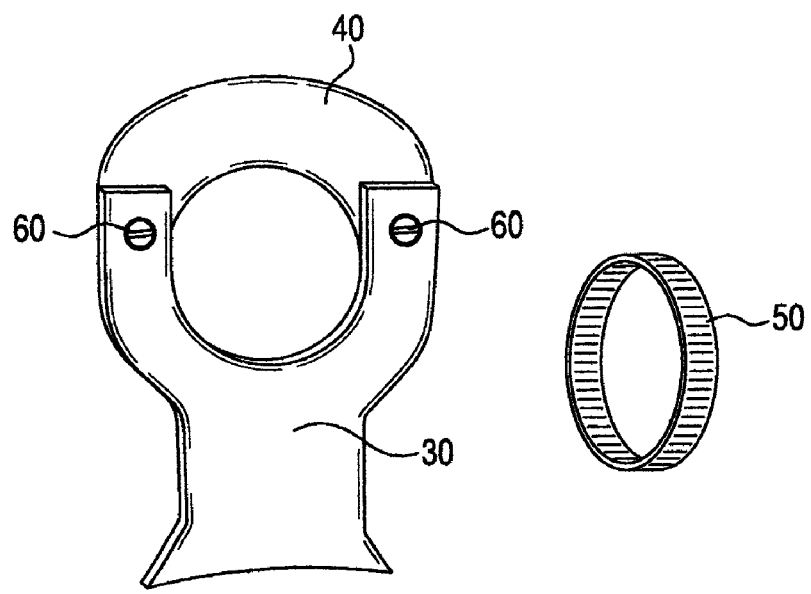
FIG. 2: is a front perspective view of the fork assembly.

FIG. 2 is the fork assembly 30, which consists of a gasket 50, top plate 40 and screws 60. This gasket 50 is preferably made of neoprene, although other materials can be used such as rubber and cork. A top plate 40 is also shown, which is fastened with screws, preferably ¼" screws, through opening 60 to the fork 30 to hold roof water supply pipes (not shown) in place, wherein the fork assembly is an inverted U shape element including spaced apart legs that extend downwardly from a connected and downwardly notched mid-section, the spaced apart legs connecting to the base element, and the notched mid-section including opposed sides that are positioned alongside an inserted segment of the connected pipe and are secured to the inserted segment by the top plate 40 and the gasket 50 that surrounds the inserted segment and connects between the opposed sides.

Figure 3:
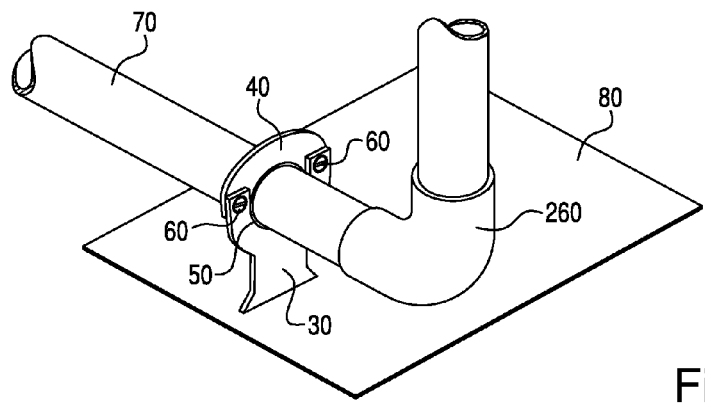
FIG. 3: is a top perspective view of a utility water supply pipe fastener with horizontal fork assembly.
Figure 4:
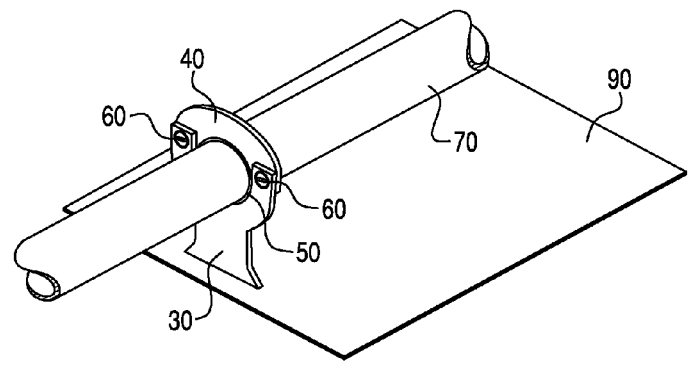
FIG. 4: is a top perspective view of a utility water supply pipe fastener with vertical fork assembly.

FIG. 3 shows a particular horizontal embodiment of the present invention using a utility water horizontal supply pipe fastener 80 as a base for the fork assembly 30, which supports the top plate 40 with the gasket disposed around the pipe 70, which is preferably but not necessarily made of PVC material. In this particular embodiment of the present invention a coupling 260 is used, which is preferably but not necessarily made of PVC. The coupling 260 shown here is a 90 degree coupling, which is the preferred angle although other orientations are acceptable. FIG. 4 shows an embodiment similar to the one in FIG. 3 with the exception that it is presented vertically using a utility water vertical supply pipe fastener 90. It should be noted that these units can also be used on a low slope as a flat roof fastener.

With fasteners 80 and 90, installation would occur as follows: the flat plate of the fastener is screwed to the decking of the roof with screws (not shown), preferably wood screws. Then the utility water supply fastener, either horizontal fastener 80 and/or vertical fastener 90 is primed with asphalt roof primer to clean and prepare the fastener surface for application of a layer of plastic roof cement, preferably a relatively thin layer, that is optimally applied over the entire utility water supply pipe fastener 80 and/or 90. The shingles are installed over the utility water supply pipe fastener 80 and/or 90, preferably with ¼" roofing nails, although other nails could be used. This creates a sandwiched area between the plastic roof cement and the asphalt underlayment of the shingle to fuse and bond the shingles to the fasteners so the only visible part of the utility water supply pipe fastener as shown in FIG. 2 is upright fork 30. These utility water supply pipe fasteners, either horizontal or vertical 80 or 90 are preferably made from aluminum, but may be made of various other materials including but not limited to stainless steel, galvanized steel, copper, other metals and/or metal alloys, but the preferred material is aluminum.

Figure 5:
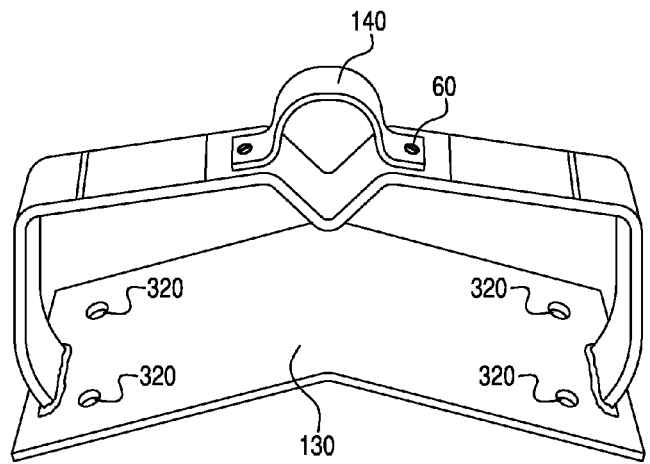
FIG. 5: is a perspective view of a ridge vent roof fastener.

Shown in FIG. 5 is a ridge vent roof fastener 130 that goes on the ridge of the roof if there is a ridge vent present or if the purchaser wants to install a ridge vent in the future. The ridge vent roof fastener is installed the same way as the hip and ridge roof fastener 20, discussed in FIG. 1 previously. This fastener 130 provides an inverted area designed on top of fasteners for water supply pipe to be connected, sandwiched between a gasket, preferably a neoprene gasket (not shown), and a top plate 140. The top plate is fastened with screws 60, which are preferably ¼ inch screws, to secure a pipe running through the created opening.

Figure 6:
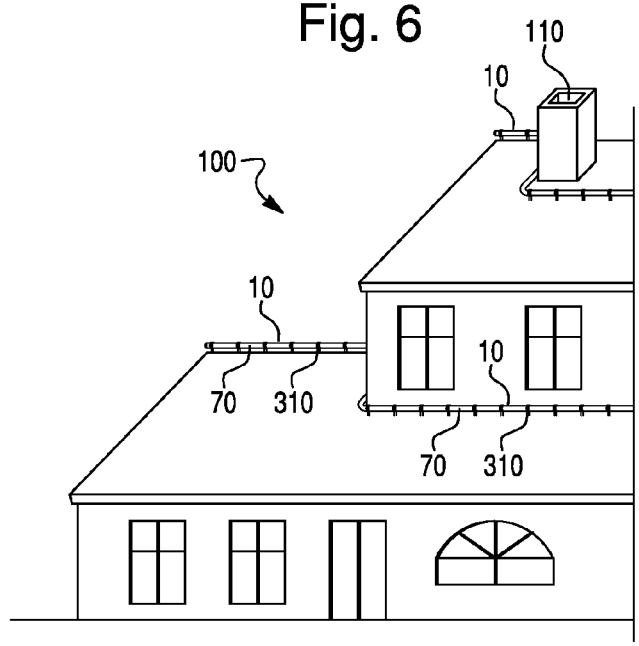
FIG. 6 is a perspective view of a fire extinguishing roof soaker on a two story house.
Figure 7:
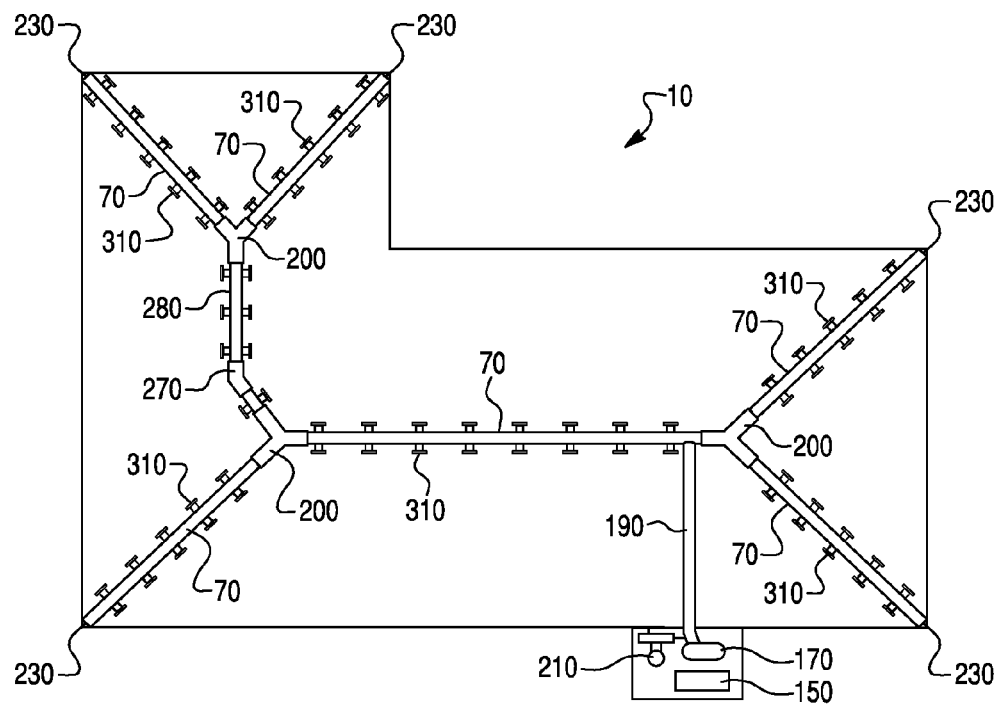
FIG. 7 is a top view of the invention illustrating the fire extinguishing roof soaker system installed on a single story house.

The installed present invention fire extinguishing roof soaker system 10 is best shown in FIGS. 6 and 7. FIG. 6 shows a two story house 100 with a particular installation of an embodiment of the present invention system 10. FIG. 7 shows a top view of a particular installation of the present invention 10. The fasteners are installed on the roof, a 1¼ inch to ¾ inch reducer is attached with PVC glue and PVC primer to the ¾ inch PVC roof water supply pipe. Next installed are sections, preferably 10 foot sections of ¾ inch PVC pipe with male and female ¾ inch PVC threaded connections 280 on each end so ¾ inch PVC piping is screwed together so that piping can be easily installed and disassembled if desired. Of particular note in this illustration is the use of a PVC 3-way coupling unit 200 in several locations. It should be well understood by those skilled in the art that an array of coupling units could be utilized to most efficiently provide coverage of the entire roof. It is preferred to use PVC primer and PVC glue to secure the PVC end cap 230 onto the water supply pipe. The ¾ inch PVC pipe that is routed throughout the hip and ridge of the entire roof using various couplings, such as but not limited to (1) 4 inch 90° angle couplings; (2) ¾ inch 45° angle couplings; (3) ¾ inch T-couplings; and (4) ¾ inch PVC flexible pipe. The PVC flexible pipe is used where intersections of the roof does not meet evenly.

Figure 8:
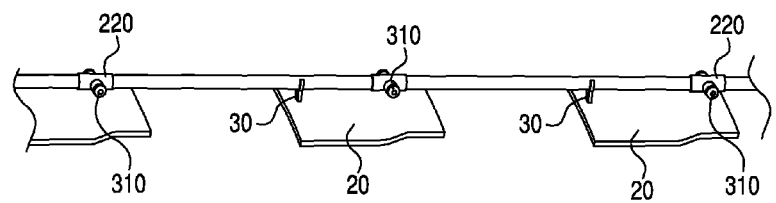
FIG. 8 is a perspective view of how water supply pipe and sprayers cradle in fork assembly.

FIG. 8 shows a close up view of a section of the installed invention. Shown are the sprayer nozzles 310, which are capable of spraying in various spray patterns, which are connected to a coupling 220, which is preferably but not necessarily a PVC 4-way coupling. The fork assembly 30 (best shown in FIG. 2) is attached to the roof through a hip and ridge roof fastener 20 (best shown in FIG. 1). The fork assembly 30 is shown holding the pipe (not numbered).

Figure 9:
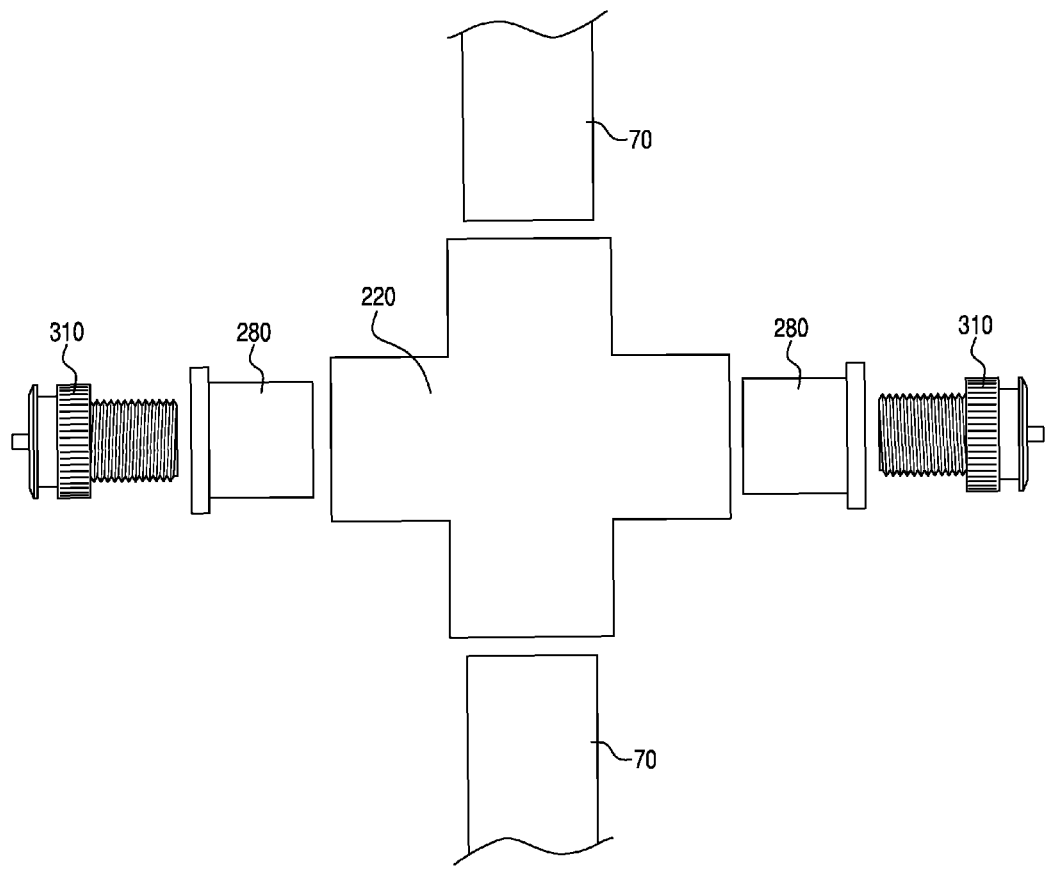
FIG. 9 is a perspective view of a 4-way coupling with reducers and sprayers.

FIG. 9 shows a close up view of the coupling 220, which is preferably but not necessarily a PVC 4-way coupling, and the sprayer nozzle 310 that are equipped with, for example, 180° or 360° duration of spraying. This is to be determined by the length of the roof from the top to the bottom for an adequate amount of water to meet the size of the roof. For many installations a 180° sprayer nozzle 310 is adequate which sprays a 7 foot, half circular diameter facing down on the roof, which gives a 3½ foot overlap spray on every sprayer nozzle on the entire roof. The sprayer nozzles 310 are installed in ¾ inch PVC threaded reducers 280 with Teflon tape. Reducers 280 are inserted in 4-way ¾ inch PVC couplings 220 with PVC primer and PVC glue. ¾ inch couplings 220 are preferably connected every 3 feet of water supply pipe, which can be spread across a roof or portion thereof.

Figure 10:
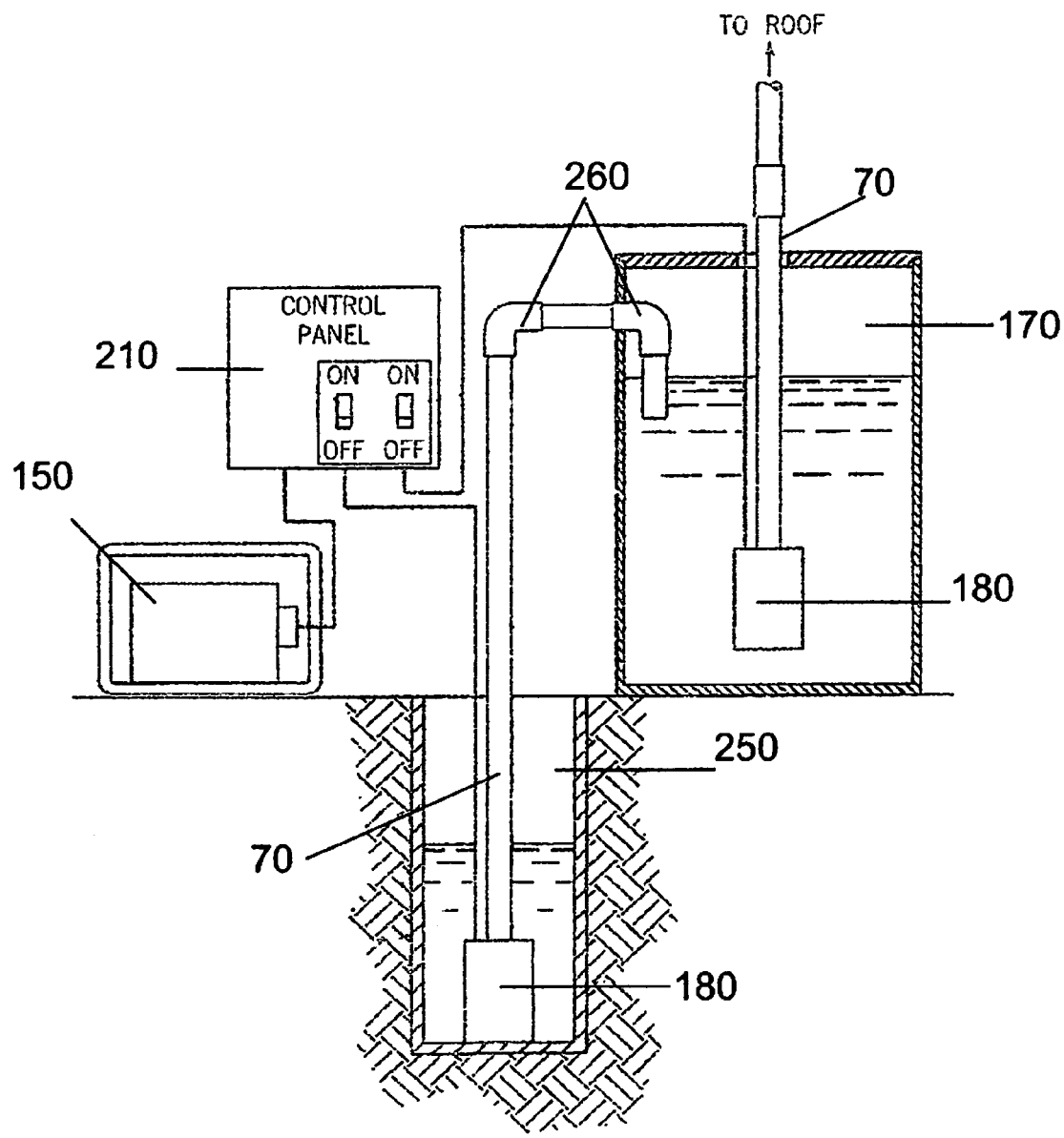
FIG. 10 is a perspective view of the water supply system.

FIG. 10 shows the water supply system. Shown is a 1¼ inch PVC water supply routed from well 250 to a service area which consists of a water reservoir 170 and a generator 150 which is wired directly to a submersible pump 180, which is preferably but not necessarily a 1 horse power submersible pump, and switch box 210 in such case of a power outage. You start generator 150 and flip switches to on position. This feeds electricity to the submersible pump 180 in well 250 and to the submersible pump 180 in reservoir 170. The water supply pipe is attached to a reservoir 170 to empty water into reservoir 170. This creates a water station.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. Specifically, various specific measurements are provided, such as for example the size of various pipes. These measurements are intended to be illustrative and to convey the preferences of the inventor, and are not intended to be limiting or suggest that the use of components of different sizes and shapes are outside the scope of the present invention. It is indeed intended that the scope of the invention should be determined by proper interpretation and construction of the appended claims and their legal equivalents, as understood by those of skill in the art relying upon the disclosure in this specification and the attached drawings.

I claim:

1. A roof mounted fire suppression system, comprising: a plurality of nozzles, a water source; a pump having a water intake associated with said water source; a water distribution system comprising: lengths of connected piping, said piping being connected to said pump and said plurality of nozzles mounted along said piping for distributing water from said water distribution system when said pump is activated; and, fastener means for fastening said connected piping to said roof, said fastener means including a base element having length and width and a slight thickness, and being resiliently formable to match the shape of a roof section pitch where said fastener is to be installed, said base element having a plurality of openings for piercing attaching devices there through that pass through said base element and fixedly attach said base element to said roof section pitch, said fastener means further including an upright fork means extending from an upper surface of said base element, said fork means to connect a segment of said connected piping to said roof section pitch, said fork means includes a gasket and a pair of upwardly oriented arms that are positioned alongside an inserted segment of said connected piping and are secured to said inserted segment by a top plate that connects between said upwardly oriented arms, surrounding said gasket and said inserted segment, and is respectively attached to each of said arms by a screw; wherein said fork means is an inverted U shape element including spaced apart legs that extend downwardly from a connected and downwardly notched mid-section.

2. A method of mounting a roof mounted fire suppression systems, comprising the steps of:
    selecting a segment of pipe with a plurality of nozzle;
    selecting a fastener means suitable for a roof pitch to which said length of pipe is to be installed, said fastener means including a base element having length and width and a slight thickness, and being resiliently formable to match the shape of said roof pitch where said fastener is to be installed, said base element having a plurality of openings for piercing attaching devices there through that pass through said base element and fixedly attach said base element to said roof section pitch, said fastener means further including an upright fork means extending from an upper surface of said base element, said fork means to connect a segment of said connected piping to said roof section pitch;
    spreading a thin layer of roofing cement on a roof contacting underside of said base element;
    laying said base element against said roof pitch and attaching said base element to said roof pitch using piercing attaching devices that pass though said base element and into said roof pitch;
    applying modular roofing materials over said base element and around said fork element according to their instructions; and,
    placing said pipe segment into said fork means includes a gasket and a pair of upwardly oriented arms that are positioned alongside said inserted segment of pipe and are secured to said inserted segment by a top plate that connects between said upwardly oriented arms, surrounding said gasket and said inserted segment of pipe, and is respectively attached to each of said arms by a screw; wherein said fork means is an inverted U shape element including spaced apart legs that extend downwardly from a connected and downwardly notched mid-section.

* * * * *